(12) United States Patent
Frishman et al.

(10) Patent No.: US 12,196,632 B2
(45) Date of Patent: Jan. 14, 2025

(54) MULTI-AXIS FIBER BRAGG GRATING SENSORS AND SYSTEMS

(71) Applicants: Intelligent Fiber Optic Systems Corporation, San Jose, CA (US); Board of Trustees, Leland Stanford Junior University, Stanford, CA (US)

(72) Inventors: Samuel Frishman, Menlo Park, CA (US); Julia Di, Mountain View, CA (US); Kian Moslehi, Mountain View, CA (US); Richard J. Black, Mountain View, CA (US); Bijan Moslehi, Mountain View, CA (US); Mark R. Cutkosky, Palo Alto, CA (US)

(73) Assignees: Intelligent Fiber Optic Systems Corporation, Milpitas, CA (US); Board of Trustees of the Leland Stanford Junior University, Standford, CA (US)

( * ) Notice: Subject to any disclaimer, the term of this patent is extended or adjusted under 35 U.S.C. 154(b) by 289 days.

(21) Appl. No.: 17/856,945

(22) Filed: Jul. 1, 2022

(65) Prior Publication Data
US 2023/0072012 A1 Mar. 9, 2023

Related U.S. Application Data

(60) Provisional application No. 63/217,662, filed on Jul. 1, 2021.

(51) Int. Cl.
*G01L 1/24* (2006.01)

(52) U.S. Cl.
CPC .............. *G01L 1/246* (2013.01); *G01L 1/243* (2013.01)

(58) Field of Classification Search
None
See application file for complete search history.

(56) References Cited

U.S. PATENT DOCUMENTS

| | | | | |
|---|---|---|---|---|
| 1,335,272 | A * | 3/1920 | Broughton | F21L 14/00 116/35 R |
| 5,097,252 | A * | 3/1992 | Harvill | G06F 3/0338 340/540 |
| 5,612,689 | A * | 3/1997 | Lee, Jr. | G06F 3/014 341/20 |

(Continued)

*Primary Examiner* — Jerry Rahll
(74) *Attorney, Agent, or Firm* — John Ryan C. Wood; Wood Patent Law

(57) ABSTRACT

A multi-axis fiber Bragg grating sensing system has a plurality of spatially distributed and mechanically isolated three dimensional multi-axis sensing towers, each having a plurality of connected nonparallel sensing pillars having a straight portion of a length and straightness to support a fiber Bragg grating and connected to at least one other of the three dimensional multi-axis sensing towers via a curved portion having a curvature radius equal to the minimum bend radius of an affixed optical fiber. The optical fiber has a plurality of fiber Bragg gratings and is affixed to each of the dimensional multi-axis sensing towers wherein a fiber Bragg grating is positioned along a straight portion of a sensing pillar of each of the towers. An interrogator captures and measures wavelength data from the fiber Bragg gratings for measuring multi-axis force information applied to each of the three dimensional multi-axis sensing towers.

22 Claims, 13 Drawing Sheets

(56) References Cited

U.S. PATENT DOCUMENTS

| | | | | |
|---|---|---|---|---|
| 6,127,672 | A * | 10/2000 | Danisch | G01B 11/18 |
| | | | | 600/595 |
| 7,903,907 | B1 * | 3/2011 | Park | G01L 1/246 |
| | | | | 385/100 |
| 2007/0201793 | A1 * | 8/2007 | Askins | G02B 6/02042 |
| | | | | 385/5 |
| 2015/0018840 | A1 * | 1/2015 | Monfaredi | A61B 90/11 |
| | | | | 73/862.041 |
| 2019/0243062 | A1 * | 8/2019 | Fok | G01L 1/243 |
| 2022/0252474 | A1 * | 8/2022 | Ramos | G02B 6/02128 |

\* cited by examiner

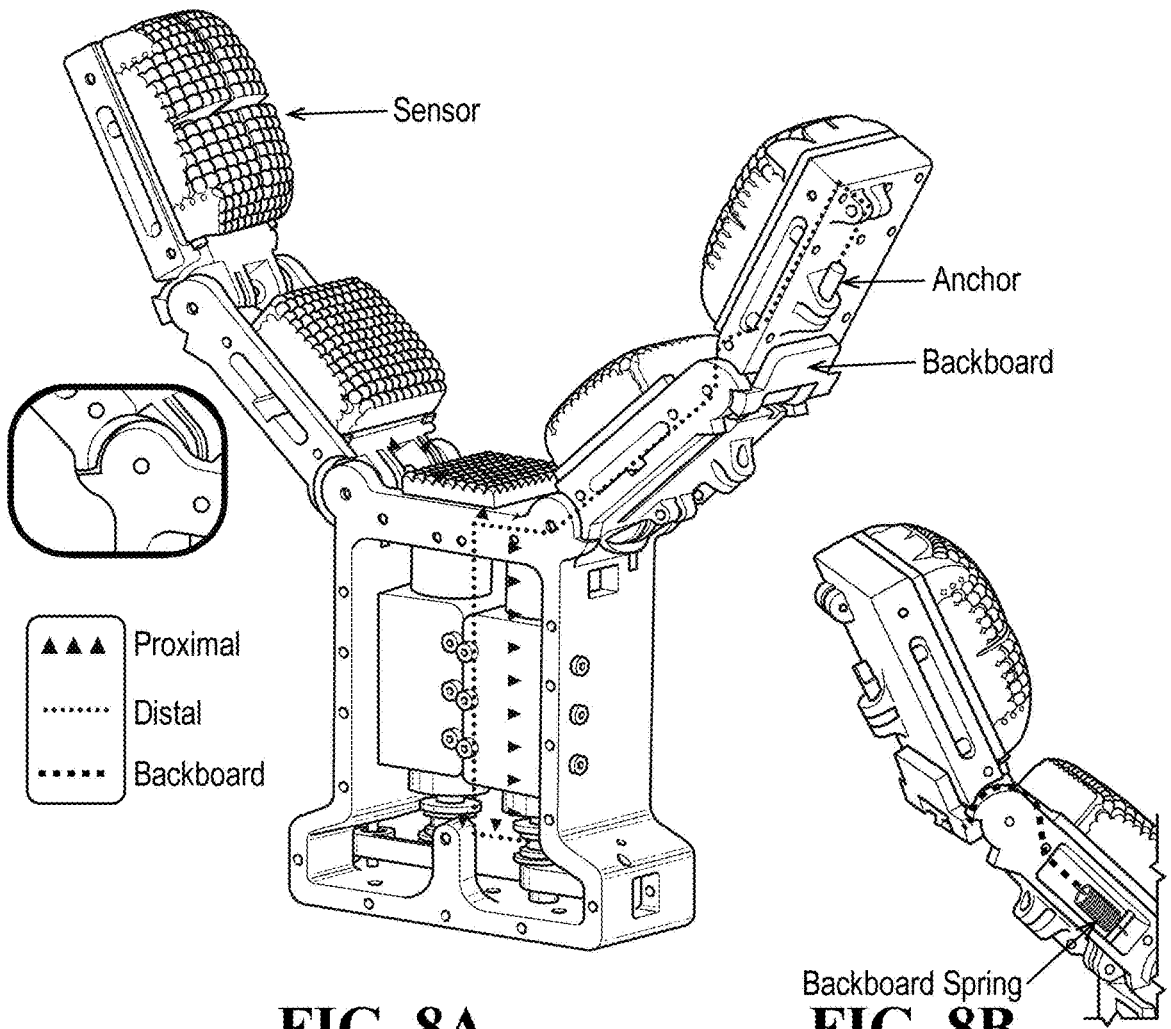
FIG. 8A
FIG. 8B
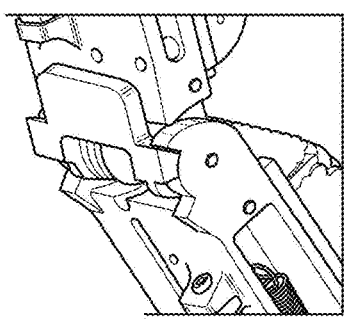
Neutral Position
FIG. 8C
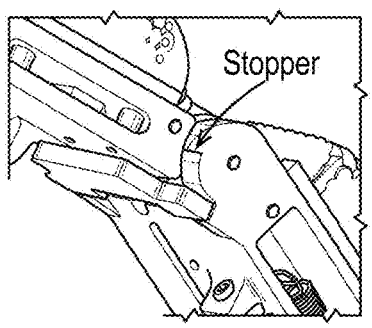
Hyperextended
FIG. 8D
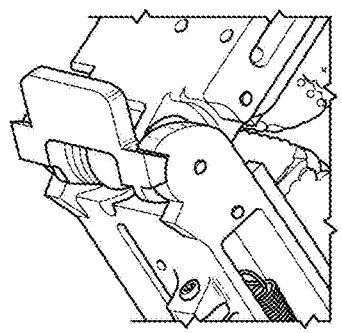
Rotated Inward
FIG. 8E

MULTI-AXIS FIBER BRAGG GRATING SENSORS AND SYSTEMS

This application claims the benefit of U.S. Provisional Patent Application Ser. No. 63/217,662 filed Jul. 1, 2021, which is hereby incorporated by reference in its entirety.

CROSS-REFERENCE TO RELATED APPLICATIONS

This invention was made under National Aeronautics and Space Administration SBIR contracts #80NSSC19C0281 and #80NSSC20C0211. The government has certain rights in this invention.

FIELD

This disclosure relates generally to the design and manufacture of fiber optic sensing systems. More specifically, this disclosure is related to multi-axis fiber Bragg grating fiber optic sensor systems.

BACKGROUND

As sensing technology develops, the market adoption of sensing and measurement of forces such as normal and shear forces, referred to as multi-axis sensing and measurement, has become increasingly widespread particularly in tactile sensing applications. For example, tactile sensing can improve end-effector control and grasp quality, especially for in robotics and free-flying robots where target approach and alignment present additional challenges. However, existing tactile sensing technologies are not suitable for harsh environments and are often susceptible to electromagnetic interference and generally require processing circuitry located physically near the sensor, factors that limit robust performance, particularly in unknown environments or over long distances.

The importance of tactile sensing in robotic systems designed for unstructured and unknown environments is increasingly recognized. Nevertheless, robots and automation are central to enabling exploration of distant and dangerous locations. For example, space exploration presents vast opportunities for robotic systems as well as unique challenges. Radiation, electromagnetic interference (EMI), and extreme temperatures all limit technologies and devices used for space applications. Prevalent sensing technologies, including capacitive, piezoresistive, and optical transducers based on imaging, are susceptible to electromagnetic interference and often require processing circuitry physically near the sensor.

Fiber Bragg gratings (FBGs) provide strain information through changes in detected wavelength. The durability of FBGs is leveraged in a wide range of applications including oil and gas, wind energy, and medical devices, but to date, FBG-based tactile sensors have been largely limited to single-axis sensing (e.g., pressure or grip force). And although the addition of multi-axis tactile sensors to robotic grippers can greatly enhance grasp performance, previously existing FBG embodiments capable of multi-axis sensing are comparatively large (e.g., designed for use as a multi-axis force/torque sensor) or embedded directly into gripper fingers.

SUMMARY

According to one aspect of the disclosed subject matter, a fiber optic sensor system is provided. A multi-axis fiber Bragg grating sensing system has a plurality of spatially distributed and mechanically isolated three dimensional multi-axis sensing towers, each having a plurality of connected nonparallel sensing pillars having a straight portion of a length and straightness to support a fiber Bragg grating and connected to at least one other of the three dimensional multi-axis sensing towers via a curved portion having a curvature radius equal to the minimum bend radius of an affixed optical fiber. The optical fiber has a plurality of fiber Bragg gratings and is affixed to each of the dimensional multi-axis sensing towers wherein a fiber Bragg grating is positioned along a straight portion of a sensing pillar of each of the towers. An interrogator captures and measures wavelength data from the fiber Bragg gratings for measuring multi-axis force information applied to each of the three dimensional multi-axis sensing towers.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of any claims.

BRIEF DESCRIPTION OF THE FIGURES

The features, natures, and advantages of the disclosed subject matter may become more apparent from the detailed description set forth below when taken in conjunction with the drawings in which like reference numerals indicate like features.

FIGS. 8A, 8B, 8C, 8D, and 8E are diagrams illustrating routing paths in the proximal and distal phalanges of a robotic gripper.

The photographs of FIGS. 10A, 10B, 10C, and 10D show several robotic grasps using a tactile sensor as provided herein.

Figure 11A:
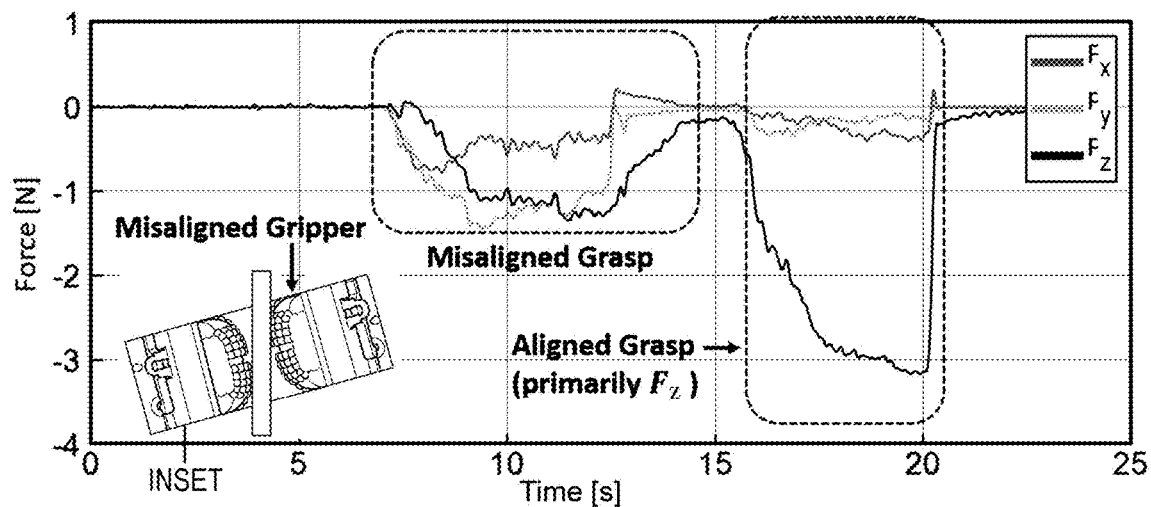
Figure 11B:
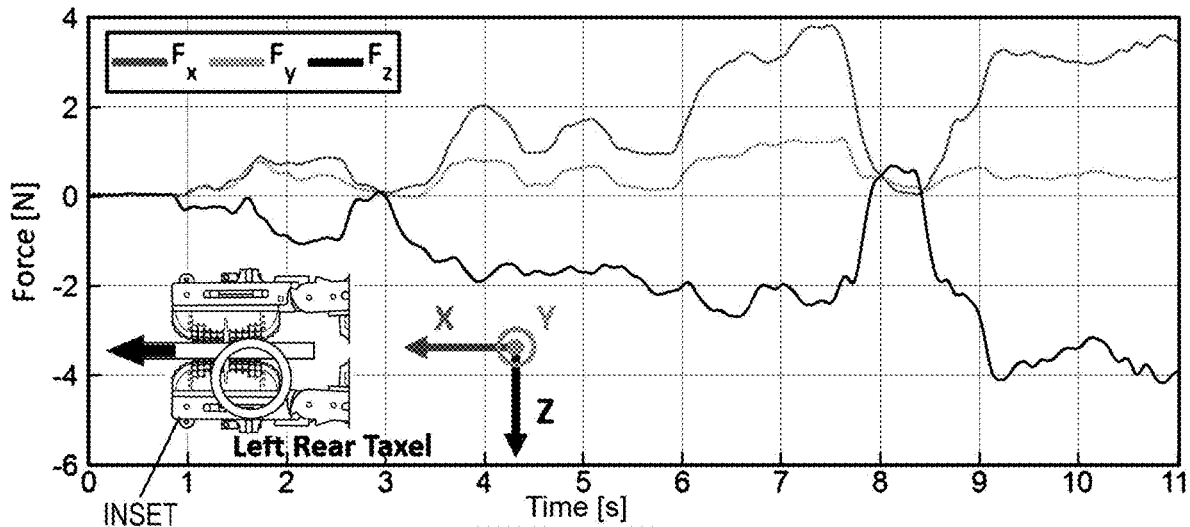
Figure 11C:
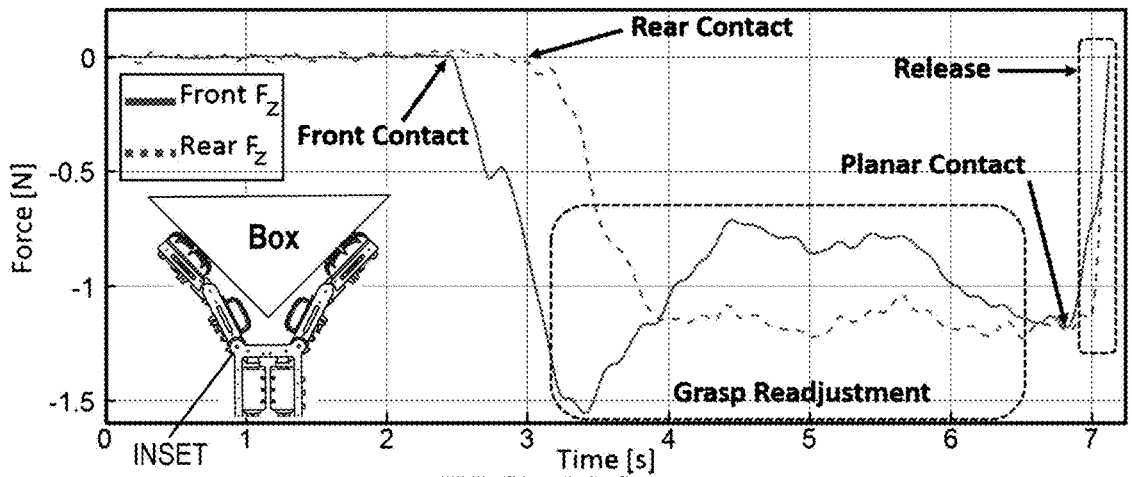

FIGS. 11A, 11B, and 11C are graphs and insets reflecting misalignment detection, shear force, and grasp adjustment, respectively.

DESCRIPTION

The following description is not to be taken in a limiting sense, but is made for the purpose of describing the general principles of the present disclosure. The scope of the present disclosure should be determined with reference to the claims. Exemplary embodiments of the present disclosure may be illustrated in the drawings, like numbers being used to refer to like and corresponding parts of the various drawings. The dimensions of drawings provided are not shown to scale.

The innovations described provide a fiber Bragg grating (FBG) sensing system for multi-axis sensing. An optical fiber is affixed to a three-dimensional sensing structure for the capture of multi-axis (i.e., multi-spatial direction) force information.

Figure 1A:
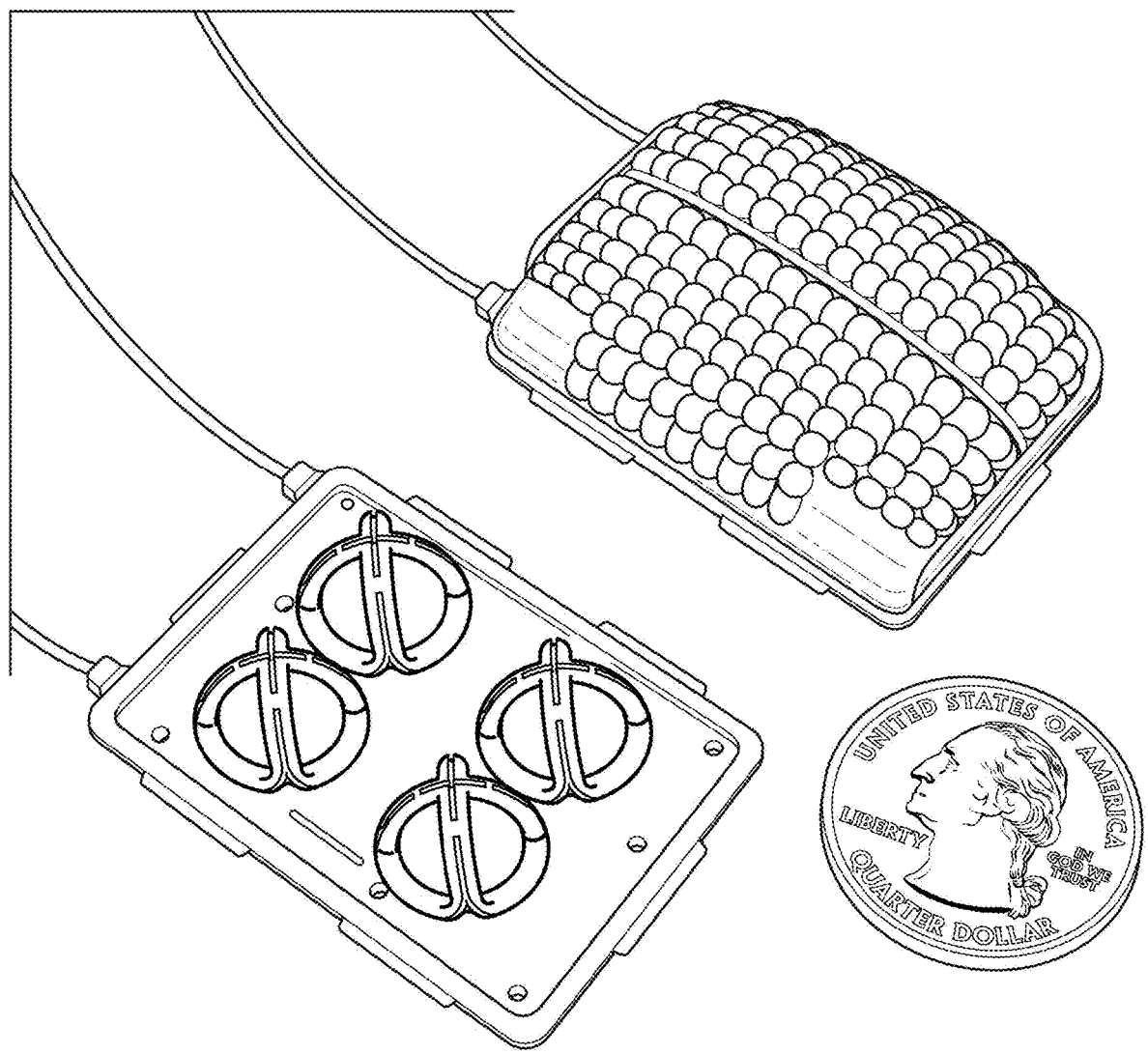
FIGS. 1A and 1B are photographs of an embodiment of a multi-axis fiber Bragg grating fiber optic sensor system.
Figure 1B:
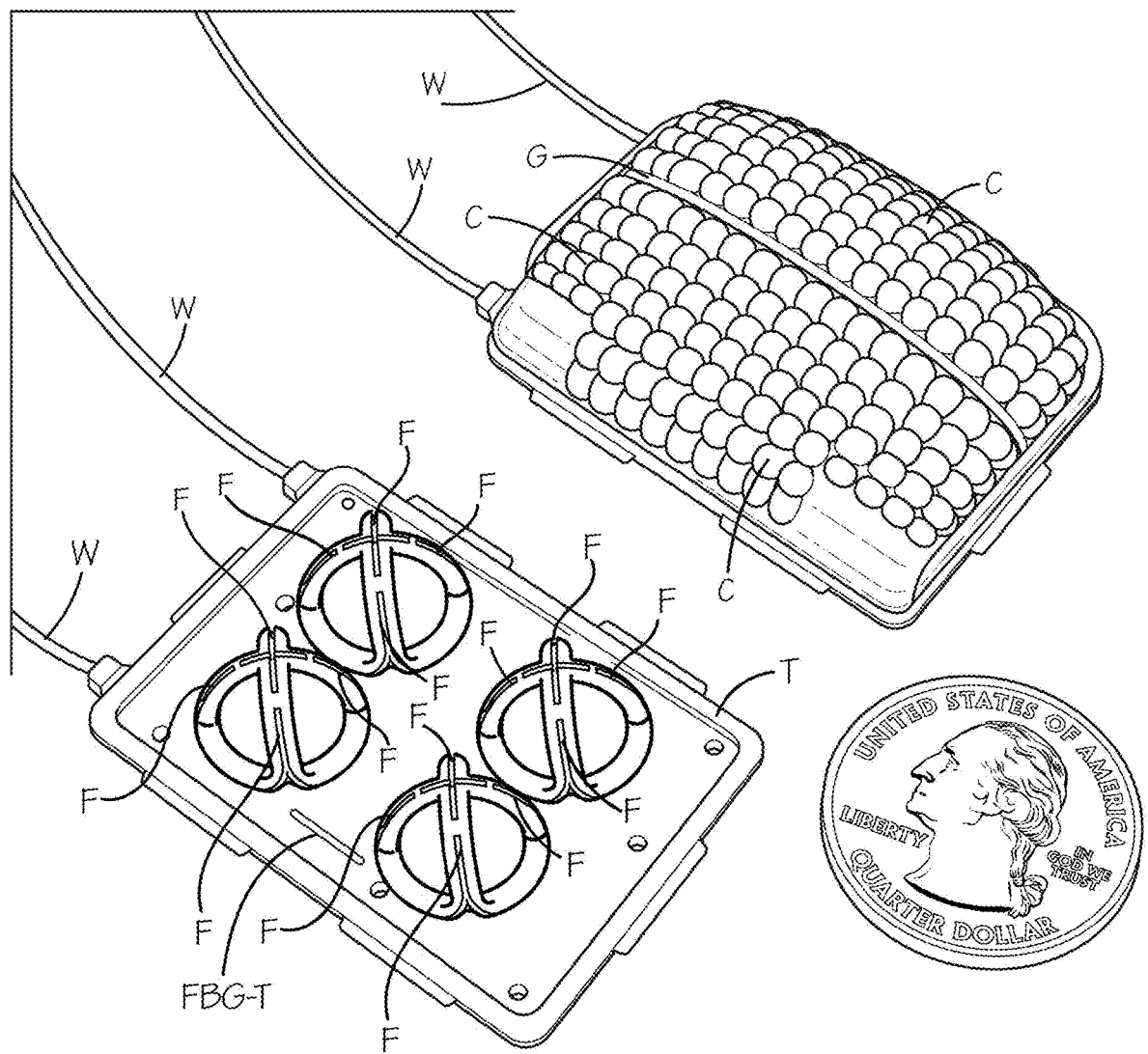

FIGS. 1A and 1B are photographs of an embodiment of multi-axis fiber Bragg grating fiber optic sensor system, namely an FBG-based, multi-axis sensing pad-shown with and without an elastomer gripping pad cover-in accordance with the disclosed subject matter. The sensing pads are shown next to a U.S. quarter dollar coin for scale. Tower structures, each embedded with four FBGs F in single optical fiber W routed in and out of tray T and along or embedded in each tower (resulting in sixteen tower embedded FBGs), provide three-axis force information at each tower structure. An additional FBG FBG-T is isolated and adhered inside a metal sleeve for temperature compensation. The sensing unit is also shown encapsulated in a urethane elastomer C, which serves as the gripping surface or pad. Deep grooves G in the pad decouple the signals between towers. The optical fiber is connected to a fiber Bragg grating sensor interrogator (e.g., a light source providing optical fiber interrogator) for capturing and measuring wavelength data reflected or transmitted from the fiber Bragg gratings for measuring multi-axis force information applied to each of three dimensional multi-axis sensing towers.

In an advantageous embodiment, sensor pads shown in FIG. 1 are mounted on a custom two-fingered gripper with independent control of the distal and proximal phalanges, allowing for grip readjustment based on sensing data. Calibrated sensor data for forces match those from a commercial multiaxial load cell with an average 96.2% RMS for all taxels. The gripper may be particularly suitable to tasks motivated by the Astrobee free-flying robots in the International Space Station (ISS): gripping corners, detecting misaligned grasps, and improving load sharing over the contact areas in pinch grasps.

Figure 2A:
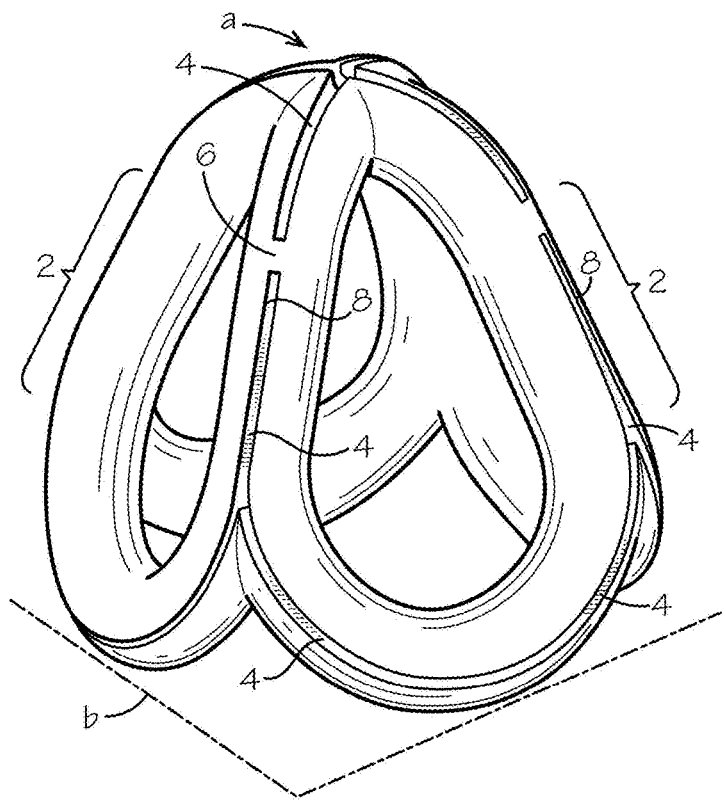
FIGS. 2A, 2B, 2C, 2D, 2E, 2F, and 2G are diagrams showing a top front perspective view, left side view, a right side view, a front view, a a rear view, a top view, and a bottom view of an embodiment of a three dimensional multi-axis sensing tower.
Figure 2B:
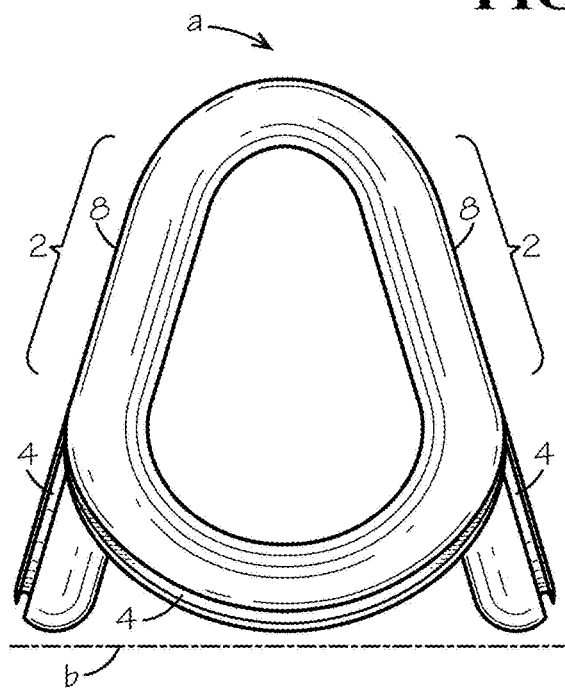
Figure 2C:
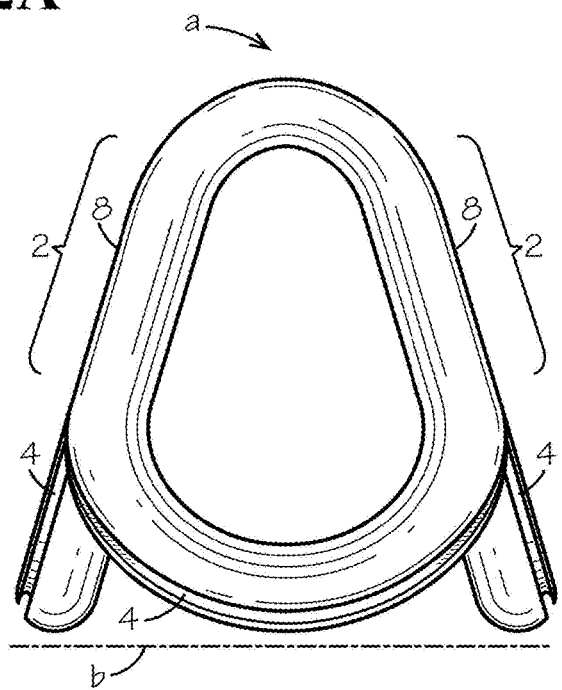
Figure 2D:
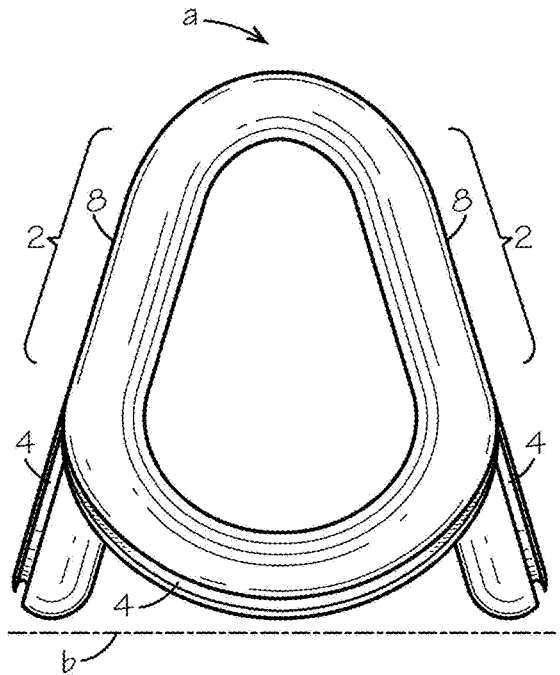
Figure 2E:
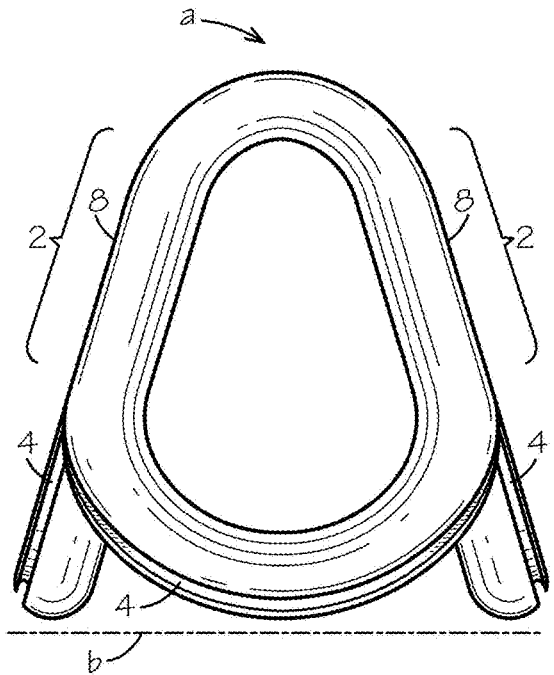
Figure 2F:
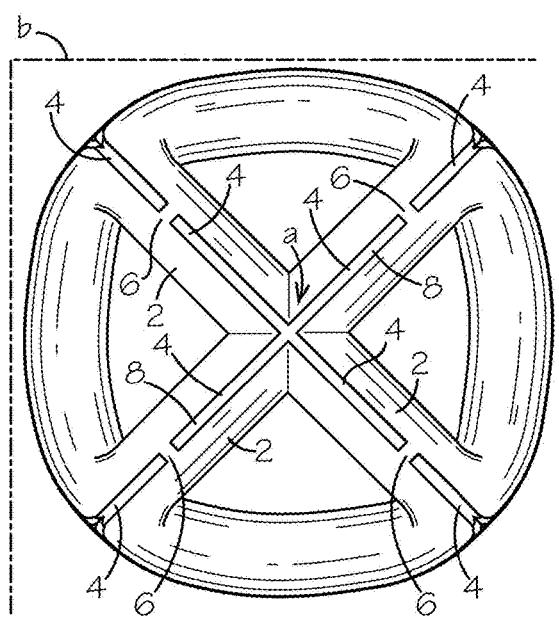
Figure 2G:
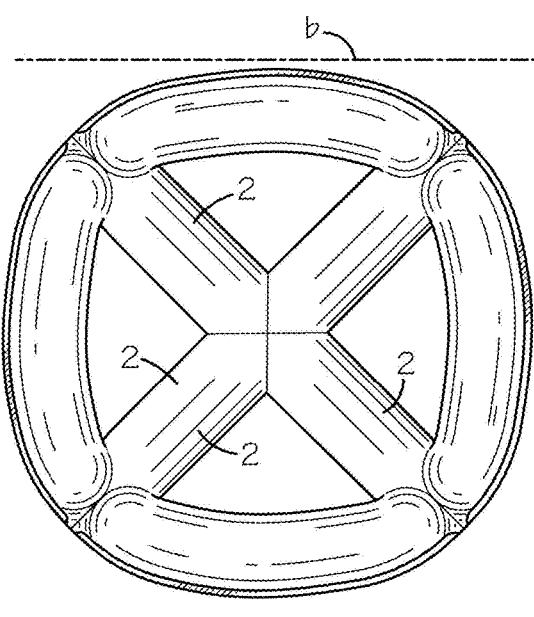

FIG. 2A is a diagram showing top front perspective view of an embodiment of a three dimensional multi-axis sensing tower consistent with the towers of FIG. 1. FIGS. 2B, 2C, 2D, 2E, 2F, and 2G are diagrams showing a left side view, a right side view, a front view, a a rear view, a top view, and a bottom view of the a three dimensional multi-axis sensing tower of FIG. 2A.

As described with reference to FIG. 2A, the three-dimensional sensing structure, referred to herein as a tower, has four sensing pillars 2 having straight portions 8 for the mounting of four fiber Bragg gratings (FBG) in an optical fiber routed via guide tabs 6 and adhered in guide grooves 4, the FBGs oriented to provide three-axis force (x, y, z axis spatial direction) information. The innovative sensing tower structure and design provides for the smallest structure for a given fiber minimum bend radius (determined based on the optical fiber specifications). The optical fiber is affixed to the tower structure, for example the optical fiber may route through guide grooves in the tower structure. The fiber Bragg gratings of the optical fiber are positioned at straight pillar portions of the tower structure—the straight pillar portions referred to as sensing pillars—and provide normal and shear force information. A plurality of mechanically isolated three-dimensional sensing towers (i.e., spatially positioned/distributed sensing towers, for example in a two by two array such as the two by two array shown in FIG. 2) provide individual three axis force readings.

Thus, in an array or spatial distribution of towers, the FBG based tower sensors provide multi-axis sensing ability at multiple locations. In other words each sensing tower has the ability to sense multi-axis forces. In a single tower, at least three FBGs are oriented to provide three-axis force (x, y, z axis spatial direction) information. In an array or distribution of towers, at least two towers are used for spatial distribution. When a tower or towers are covered by a pad such as a gripping pad for tactile sensing, the apex of the towers is at least covered such that forces applied on exterior gripping portions of the pad are captured by the sensing tower FBGs—in other words the apex of the towers acts as a tactile point.

Figure 3:
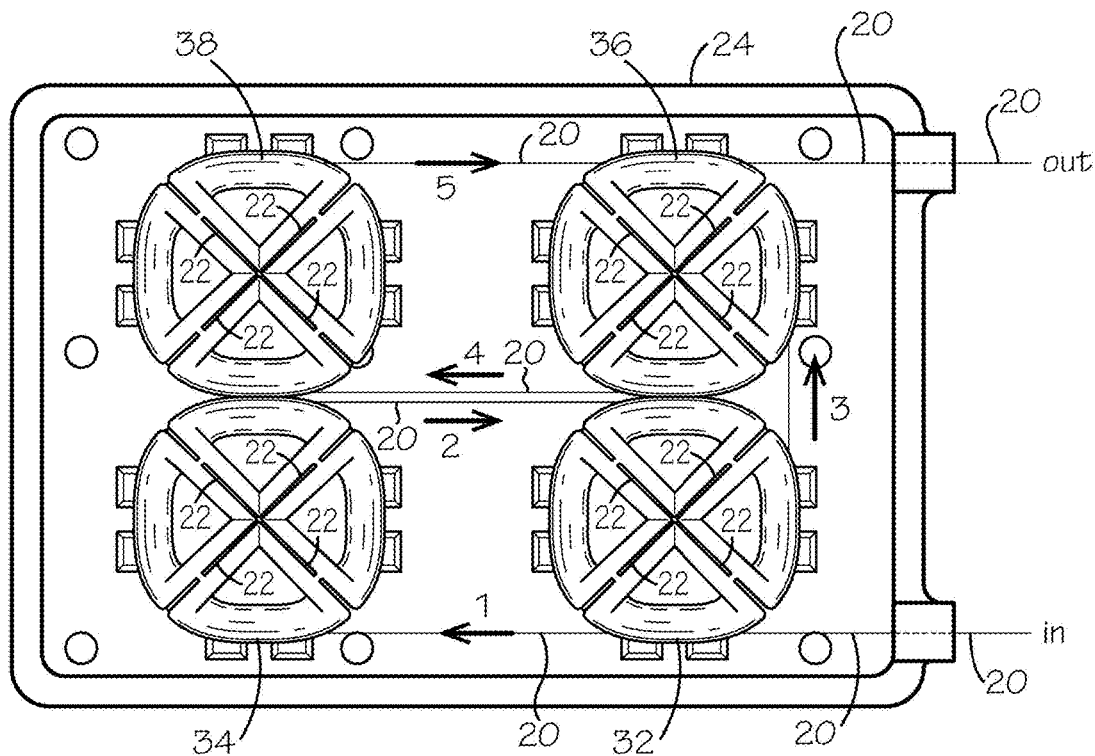
FIG. 3 is a diagram showing a top view of an embodiment of a single fiber tactile sensing pad composed.

For example in a two tower by two tower sensor pad such as that shown in the sensing pad of FIG. 3, four three axis force readings (x, y, z) are captured. For tactile sensing, FBG based tactile sensors that measure normal and biaxial shear strains in the pads of a gripper using a single optical fiber with fiber Bragg grating (FBG) sensors are provided. The sensing unit may be encapsulated in or covered by an elastomer, which also serves as a gripping surface.

The four connected sensing pillars 2 and connecting portions make up the tower structure of FIG. 2A. Optical fiber having four fiber Bragg gratings is routed in and affixed to the tubular structure in guide grooves 4 such that each fiber Bragg grating is positioned along a straight portion 8 of each sensing pillar 2. The three dimensional tower structure of FIG. 2A may be described in geometric terms as approximating a right square pyramidal structure having rounded vertices such that the pyramidal structure is defined by straight rods defining the straight pyramidal edges and curved rods defining the rounded pyramidal vertices. The connected sensing pillars emanate from the apex a of the right square pyramid—and thus are nonparallel—and the affixed fiber Bragg gratings provide multi-axis force sensing in three spatial directions (x, y, z).

The pillars may be made of a plastic such as urethane or a ceramic material and the three dimensional tower structure, as well as the mounting tray such as that shown in FIG. 1, may be formed by a 3D printing process. The optical fiber routes through grooves in the straight and curved portions of the structure that make up each tower to position the fiber Bragg gratings at the sensing pillars. The single fiber may be mounted to the tower structure by routing the fiber into the guide grooves and threading under guide tabs. The depth of the groove on each pillar is sufficient to align the optical fiber and hold it with cyanoacrylate adhesive.

Figure 2H:
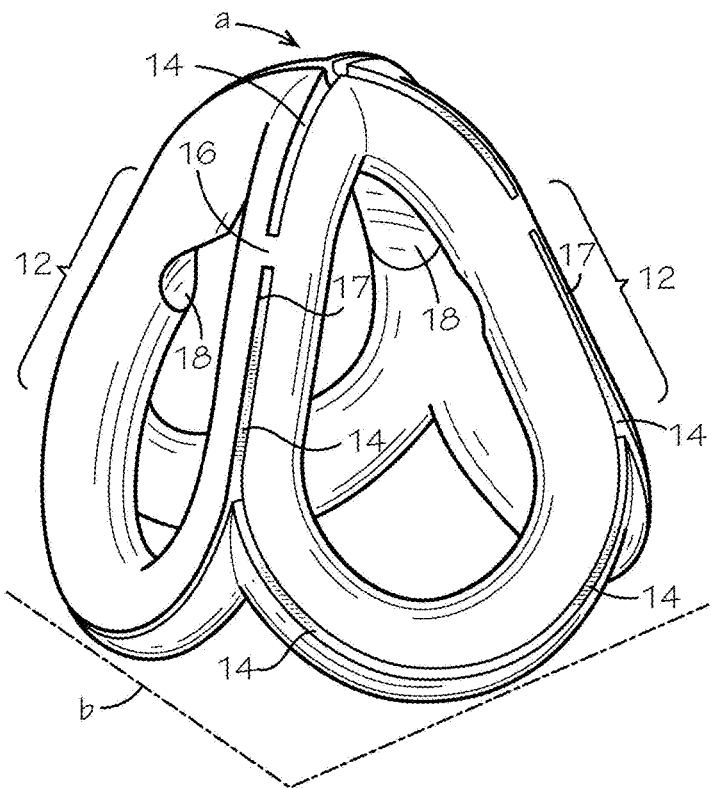
FIGS. 2H, 2I, 2J, 2K, 2L, 2M, and 2N are diagrams showing a top front perspective view, left side view, a right side view, a front view, a a rear view, a top view, and a bottom view of an embodiment of a three dimensional multi-axis sensing tower.
Figure 2I:
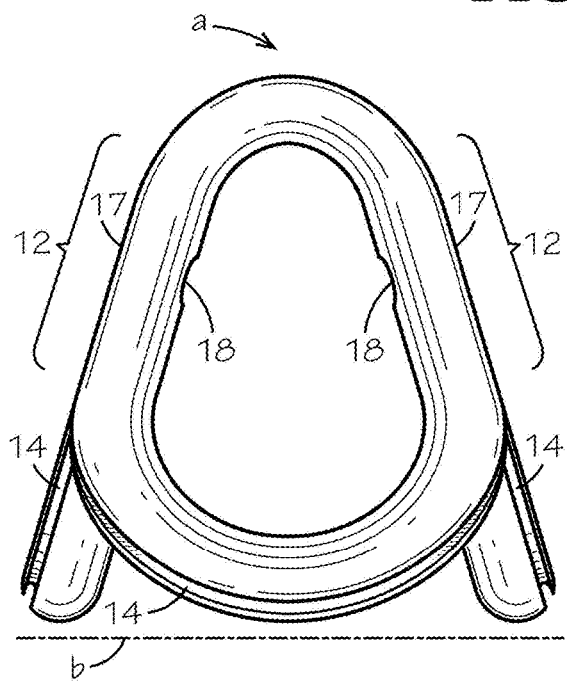
Figure 2J:
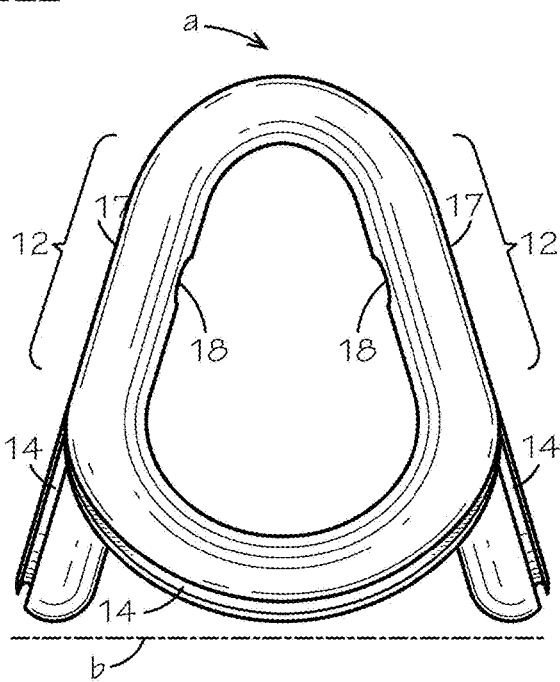
Figure 2K:
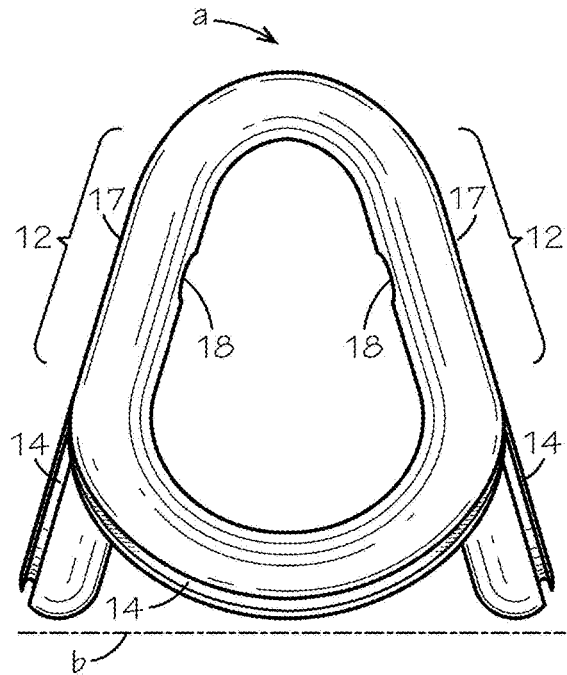
Figure 2L:
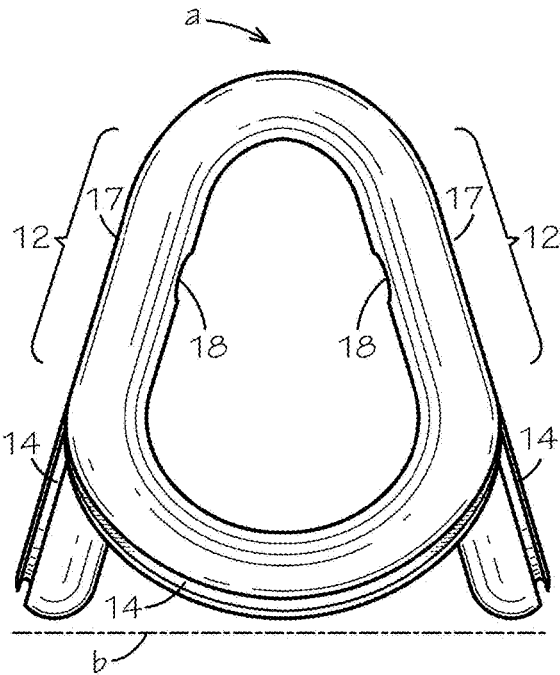
Figure 2M:
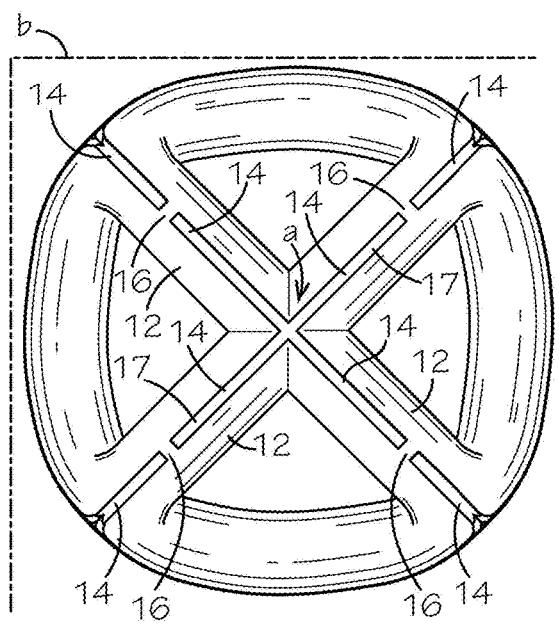
Figure 2N:
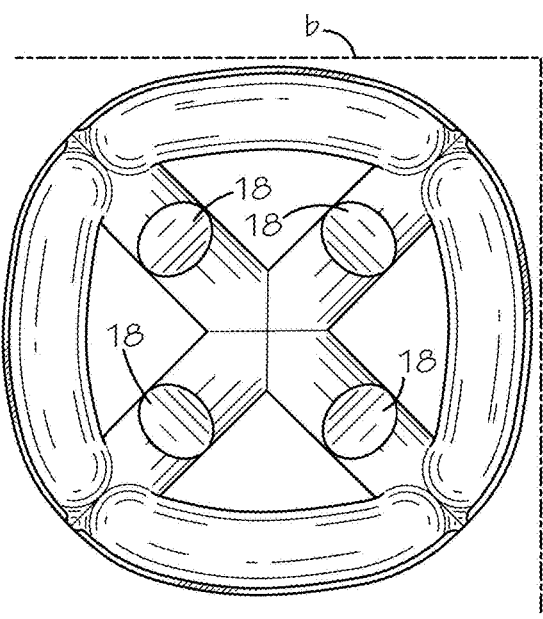

FIG. 2H is a diagram showing top front perspective view of an embodiment of a three dimensional multi-axis sensing tower consistent with the towers of FIG. 2A and having cutouts 18 for fiber Bragg grating sensitivity adjustment and improvement. FIGS. 2I, 2J, 2K, 2L, 2M, and 2N are diagrams showing a left side view, a right side view, a front view, a a rear view, a top view, and a bottom view of the a three dimensional multi-axis sensing tower of FIG. 2H. s described with reference to FIG. 2H, the three-dimensional sensing structure, referred to herein as a tower, has four sensing pillars 12 having straight portions 17 for the mounting of four fiber Bragg gratings (FBG) in an optical fiber routed via guide tabs 16 and adhered in guide grooves 14, the FBGs oriented to provide three-axis force (x, y, z axis spatial direction) information. Tower cutouts 18 are positioned proximate straight portions 17 for fiber Bragg grating sensitivity adjustment and improvement from force (normal and shear) applied to the tower such as at tower apex a.

As shown in FIG. 2A, the tower sensor structure, dimensions, and design are constrained by optical fiber requirements such that fiber routing must satisfy a set minimum bend radius and accommodate pre-determined FBG lengths. For example, for 125 µm and 80 µm fibers, bend radii should not fall below 6 mm and 4 mm, respectively. Thus, the bend radii of the curved sensing pillar connecting regions should not fall below 6 mm and 4 mm. Importantly, at a bend radii of 6 mm and 4 mm, the tower footprint b may be as small as 144 sq. mm (the resulting footprint bounds being a 12 mm by 12 mm square) or 64 sq. mm (the resulting footprint bounds being a 8 mm by 8 mm square), respectively-a substantial innovation and size reduction. In application, for example due to factors such as a desired margin buffer, the tower footprint b may be slightly larger such as 196 sq. mm or 100 sq. mm in the case of 7 mm and 5 mm bend radii, respectively. Typical FBG lengths are either 4 mm or 2 mm. For gripping, these dimensions—fiber minimum bend radius and FBG length—govern the sensing pad design required to fit within a small gripper while providing multi-axial sensing.

The straight portions 8 of the pillars 2 of FIG. 2A are 4 mm in length, accommodating a 2 mm FBG with a 1 mm buffer on either end. It is critical for FBGs to be placed on a straight section of the pillar to avoid double peaks in signal. Pillar angle, $\theta_p$, determines structure sensitivity to normal vs. shear forces. In this embodiment, informed by finite element analysis (FEA) as described herein, a 70° angle is selected to achieve a desirable balance between normal and shear sensitivity. These parameters help define the tower geometry.

Operating wavelength also influences minimum bend radius and tower structural size. For example, operating closer to the second mode cutoff of a given fiber means the optical field is more tightly guided resulting in less bending loss and thus tighter bends. In other words, shorter wavelengths such as 650 nm (or as low 600 nm) to 850 nm as a light source (i.e., operating wavelength) lead to less loss, thus a higher number of FBGs may be seen. Operating wavelength may also reduce scaling-dimensions may be scaled if the optical fiber is designed to operate at 850 nm or even in the visible at 650 nm, rather than the standard telecom wavelength of 1550 nm.

The present innovations are particularly and advantageously suited to tactile sensing and grippers. Specifically, the multi-axis tactile sensing innovations described provide electromagnetic interference immunity and excellent signal-to-noise ratios over long distance, improving robotic gripping capabilities in applications such as space robotics, manufacturing, and warehouse robotics. Relating to tactile sensing, among the many technologies considered for tactile sensing, optical fiber sensors may provide a number of advantages including EMI immunity, tolerance of vibration and impact, resistance to corrosion, resistance to extreme temperatures (cryogenic to 1000° C.), and radiation. Moreover, FBGs exhibit excellent signal-to-noise ratio (SNR) and sensitivity to very small strains. And FBGs may be routed over long distances with negligible loss. Multi-axis sensing applications for roads and bridges (for example the tower sensors positioned near desired surface sensing locations) for structural health monitoring may also be suitable.

Figure 4:
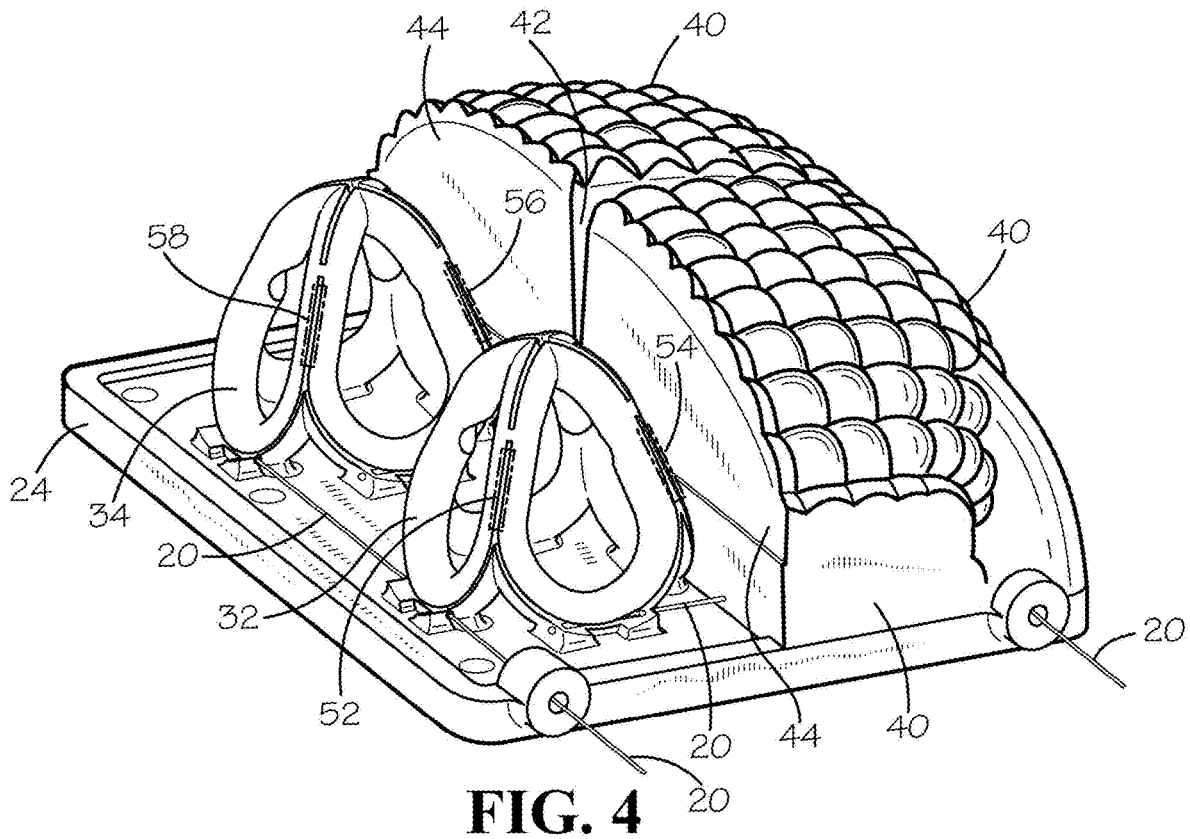
FIG. 4 is a diagram showing a perspective view of the sensing pad of FIG. 3 partially covered by a pad.

FIG. 3 is a diagram showing a top view of an embodiment of a single fiber tactile sensing pad composed of four spatially distributed and isolated sensing towers each with four FBGs mounted along straight pillar portions 22, affixed to a planar pad tray, consistent with the innovations of the FBG-based, multi-axis sensing pad of FIG. 1 and the tower embodiment of FIG. 2H. FIG. 4 is a diagram showing a perspective view of the sensing pad of FIG. 3 showing the apex of towers 36 and 38 covered/encapsulated by urethane pad cover 40 (in operation the apex of all four spatially distributed and isolated sensing towers including towers 32 and 34 are covered such that each tower apex acts as a tactile point for its corresponding tower). Exemplary FBGs 52, 54, 56, and 58 are diagrammatically shown to better visibly illustrate their position on the straight pillar portions 22 of towers 32 and 34-in operation these FBGs will be at least partially within the guide grooves on the straight pillar portions 22 of towers 32 and 34 such as in the photograph of FIG. 1.

In total, the sensor shown in FIGS. 3 and 4 consists of sixteen FBGs, all routed along a single fiber 20 that is routed in from IN to position 1 to position 2 to position 3 to position 4 to position 5 to OUT. Urethane pad cover 40 structure includes grooves 42 and isolation walls 44 to mechanically isolate the towers. Planar mounting tray 24 includes structures to guide fiber 20 and features, in concert with tower structures themselves, to fix the FBG along the straight sections of each pillar. An additional strain isolated FBG not shown in FIGS. 3 and 4 may provide temperature compensation as shown in FIG. 1.

Figure 5:
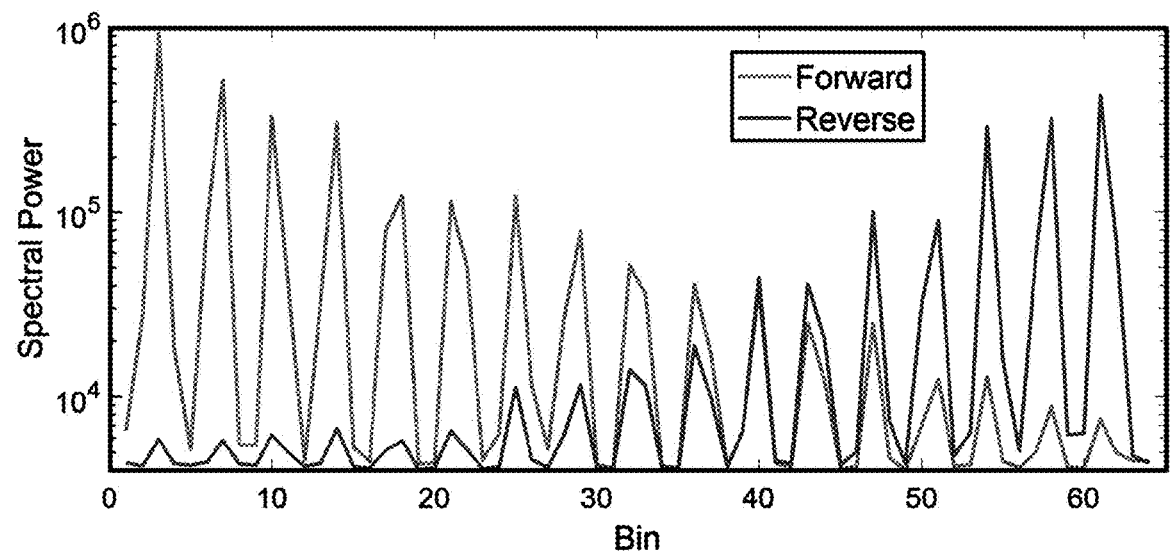
FIG. 5 is a graph showing the strength of FBG signals of the fiber of FIG. 1.

Because of the large number of relatively tight bends, the routed fiber has some signal attenuation down its length. Advantageously the fiber of FIG. 1 (and fibers of the other provided sensing systems) may be read from both ends, using the stronger of the corresponding FBG signals for data as shown in the graph of FIG. 5. As shown in the graph of FIG. 5, seventeen peaks are visible, corresponding to each FBG; by reading the single fiber from both forward and reverse directions the strongest signal for a given FBG may be used. Thus, in the tactile sensing pad of FIGS. 1, 3, and 4, the single fiber is read from both forward and reverse directions to minimize attenuation.

FIG. 3 shows an innovative tactile sensor using a single optical fiber routed through four sensing structures which may be embedded in an elastomeric pad such as shown in FIGS. 1 and 4. The sensor pads may be advantageously mounted on a two-finger two-phalange gripper intended for use with the Astrobee free-flyer. Calibration studies show that the pads match force data from a commercial load cell with 96.2% RMS accuracy. Tactile data may be used to modulate the grasp force and make adjustments to improve contact and load sharing when grasping large and small objects with initial misalignment. And these innovations may be applied to extra-vehicular applications that will require the durability afforded by optical fibers as described. The multiaxial optical tactile sensor of FIG. 3, may be particularly suited for use in robotic grippers in harsh environments such as space, and as designed for the Astrobee free-flyer platform inside the ISS, a first step toward extravehicular applications.

The towers of FIG. 3 may be printed on a Stratasys Objet24 3D printer (Vero WhitePlus) and cast inside a urethane elastomer (Smooth-On VytaFlex 20). The cover of FIG. 4, made of a urethane material, includes deep grooves separating each tower for signal decoupling across towers.

Figure 6:
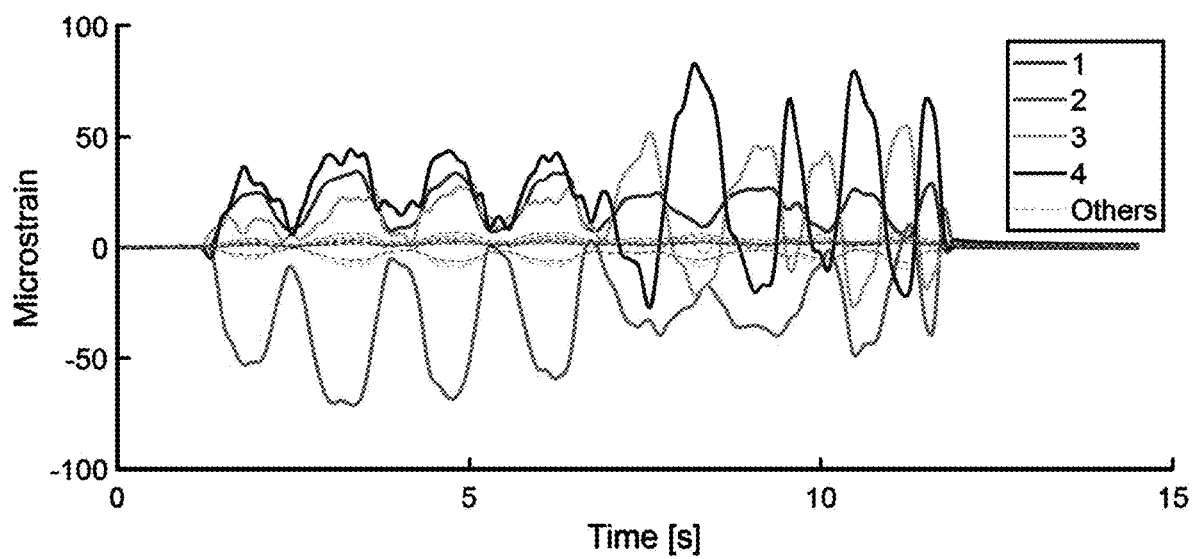
FIG. 6 is a graph showing sample strain data.

FIG. 6 is a graph showing sample strain data gathered from all four towers with only one tower under loading. The sample data of FIG. 6 was gathered while applying loads on a single taxel: colored lines 1-4 show signals from FBGs in the loaded tower; other FBGs (dashed lines) provide little signal. Large microstrain values are observed by the tower under loading, with minimal signal from adjacent towers.

As shown in the diagrams of FIGS. 8A, 8B, 8C, and 8D, the sensor pads of FIGS. 3 and 4 are mounted on a custom, two-finger two phalange gripper intended for use with the Astrobee free-flyer. To fit the gripper phalange, each two by two sensor is rectangular (i.e., slightly longer than it is wide). The gripper is underactuated, but provides independent control of the distal and proximal phalanges. The distal phalange has the ability to hyperextend to achieve planar contact for pinch or corner grasps. Two motors are located inside the gripper body and provide tendon tension to the proximal and distal phalanges, respectively. Torsion springs in each joint provide extension. The design also includes a "distal backboard" that is engaged during distal hyperextension. The backboard is preloaded with a spring and pushes against the distal phalange, forcing the phalange inward when engaged. A hard stop prevents the backboard from engaging when the phalange is flexed inward beyond the midpoint of its range of motion. This provision makes the distal joint stiffer when hyperextended and extends the overall grasp envelope, while also allowing planar contact in pinch grasps as the fingers close together. The motor actuating the proximal phalange must overpower the backboard for hyperextension to occur, therefore the backboard spring is preloaded to only slightly increase the torque required of the distal torsion spring.

The diagrams of FIGS. 8A, 8B, 8C, 8D, and 8E show a custom two-finger gripper with the sensing pads mounted at the distal phalanges. Two motors route to independent proximal and distal tendons, providing an underactuated design with two controllable DoF (only one side of each tendon routing shown for simplicity). A backboard feature, loaded by a spring embedded inside the proximal phalange, provides a biasing inward force on the distal joint when it is extended beyond the neutral position. The backboard stiffens the distal phalange during hyperextension.

The gripper body houses two Portescap gearmotors (16G 214E, 27:1), one for each of the two tendons that actuate both of the proximal and distal phalanges, respectively. FIGS. 8A, 8B, 8C, and 8D illustrate routing paths in the proximal and distal phalanges (only one side of each tendon routing is shown for simplicity) of the robotic gripper. The motors and pulleys are sized to provide 70 N of tension in the cables, achieving a ≈4 N grasp force in pinch. Moreover, the selected gearmotors are backdrivable, which is useful for compliant grasp adjustment. Tendons are anchored to swivel-head screws for tensioning. Hard stop features at the proximal and distal joints limit extension and allow preloading of the joint torsion springs.

The sensor structure and design described are informed by finite element analysis (FEA), including sensitivity to normal and shear forces and comparison of tower structures with and without cutout features in the interior-facing side of each pillar. The cutouts promote bending in the pillars, which are otherwise substantially affected by axial strain. For example, in a weightless environment, and specifically for Astrobee tasks, shear forces are expected to be relatively small compared to normal loads. Accordingly, pillar angle is tuned for increased shear sensitivity. In the FEA, a 1 N normal force and 0.33 N shear is applied resulting in the data shown in the diagrams of FIG. 7A and FIG. 7B.

Figure 7A:
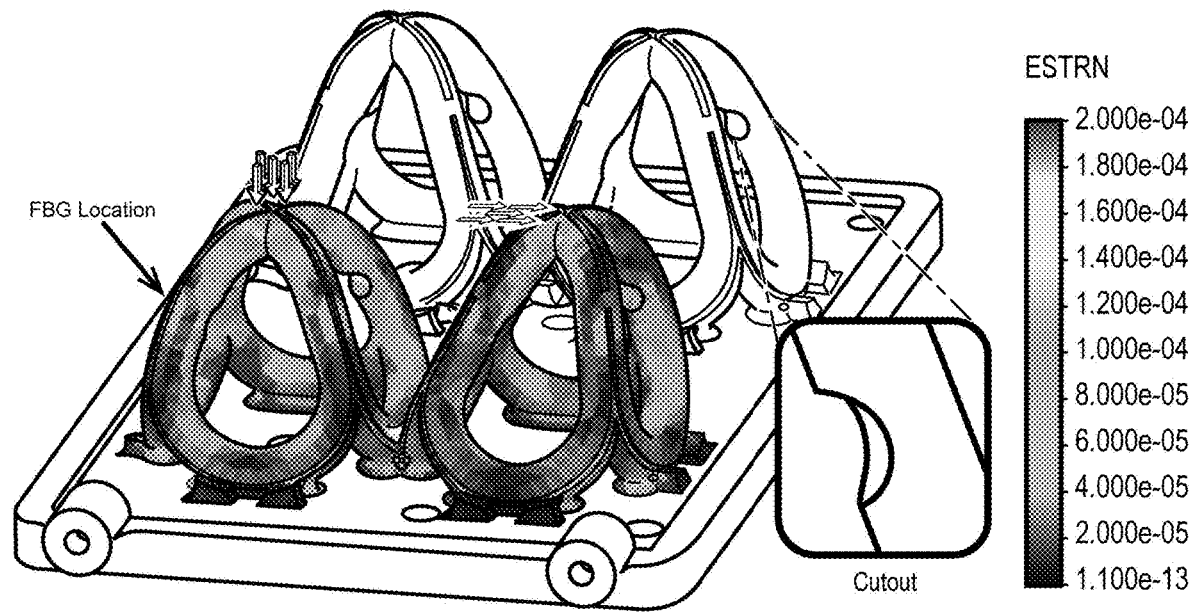
FIG. 7A and FIG. 7B are diagrams showing normal and shear forces applied to tower structures in a sensor pad.
Figure 7B:
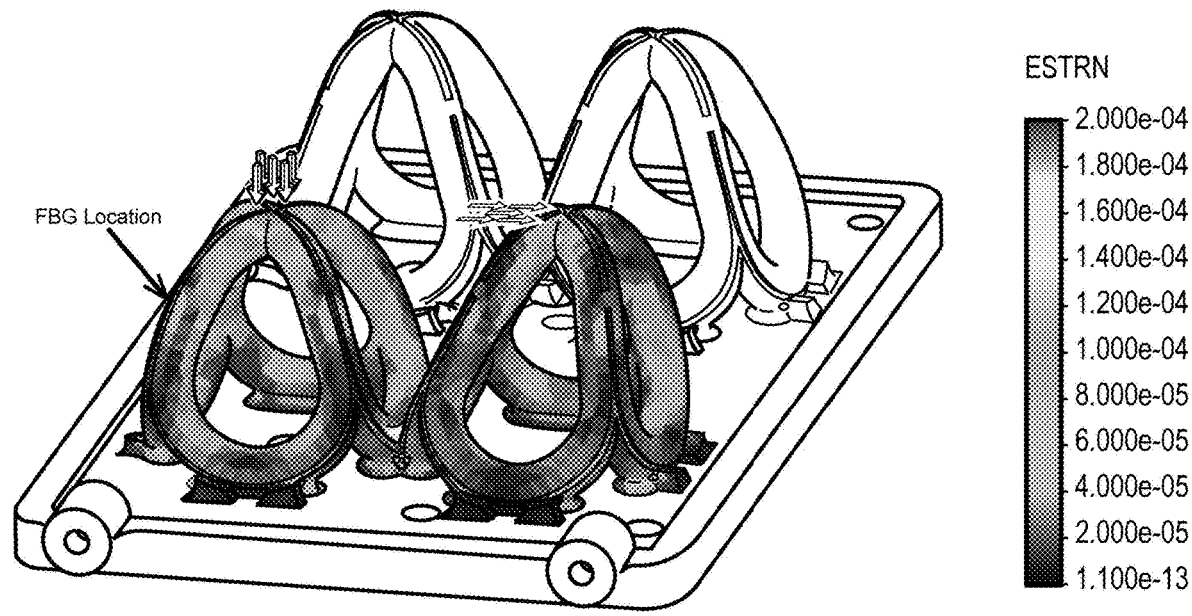

FIG. 7A and FIG. 7B are diagrams showing normal and shear forces applied to tower structures in a sensor pad. The diagrams of FIG. 7A and FIG. 7B provide a finite element analysis (structure deformation is exaggerated). Normal and shear forces are applied to the tactile point of the tower structures-shown as normal and shear forces at tower apex a. The structure in the diagram of FIG. 7A includes cutout features in the pillars. The structure diagrams of FIG. 7B are shown without cutout features. Significantly more strain is observed at the FBGs locations when cutouts are present. Moreover, tower angle results in a desirable ratio between normal and shear force sensitivity.

A consideration of the grasp contact area and phalange-object alignment may improve grasp quality (e.g. of a handrail or cylindrical tool) of FBG technology for sensing spatially-distributed, multi-axis forces on gripper phalanges. The importance of these parameters has been noted in particular for underactuated grippers. Typically, underactuated end-effector designs involve a trade off between the ratios of joint torques and stiffnesses to achieve desired hand closure patterns as well as grasp stability. For example, tune spring stiffnesses to maintain a parallel constraint on the distal phalanges, unless contact is made proximally, enabling planar contact in pinch grasps. Linkage mechanisms have also been explored to achieve similar capabilities. For free-floating robots such as Astrobee, misalignment on initial contact may be common. Thus control two degrees of freedom is provided to enable grasp readjustment based on multiaxial tactile data.

The described solutions offer several particular advantages over existing tactile sensors. First, the innovations provided use optical fibers as the sensing modality and are immune to electromagnetic interference and radiation. Compared to conventional wired solutions, the encapsulated optical fibers are immune to electromagnetic interference-critical in the harsh environment of space. This enables the sensor to be used in applications where tactile sensing has previously been extremely challenging (e.g. space, MRI room, etc.). Additionally, sampling is possible at over 1 kHz to detect dynamic events. Also, the sensor can operate in a wide range of temperatures. Moreover, the form factor and sensing tower structure and design enables a compact sensor that may be embedded into the fingertips of robotic grippers.

Figure 9:
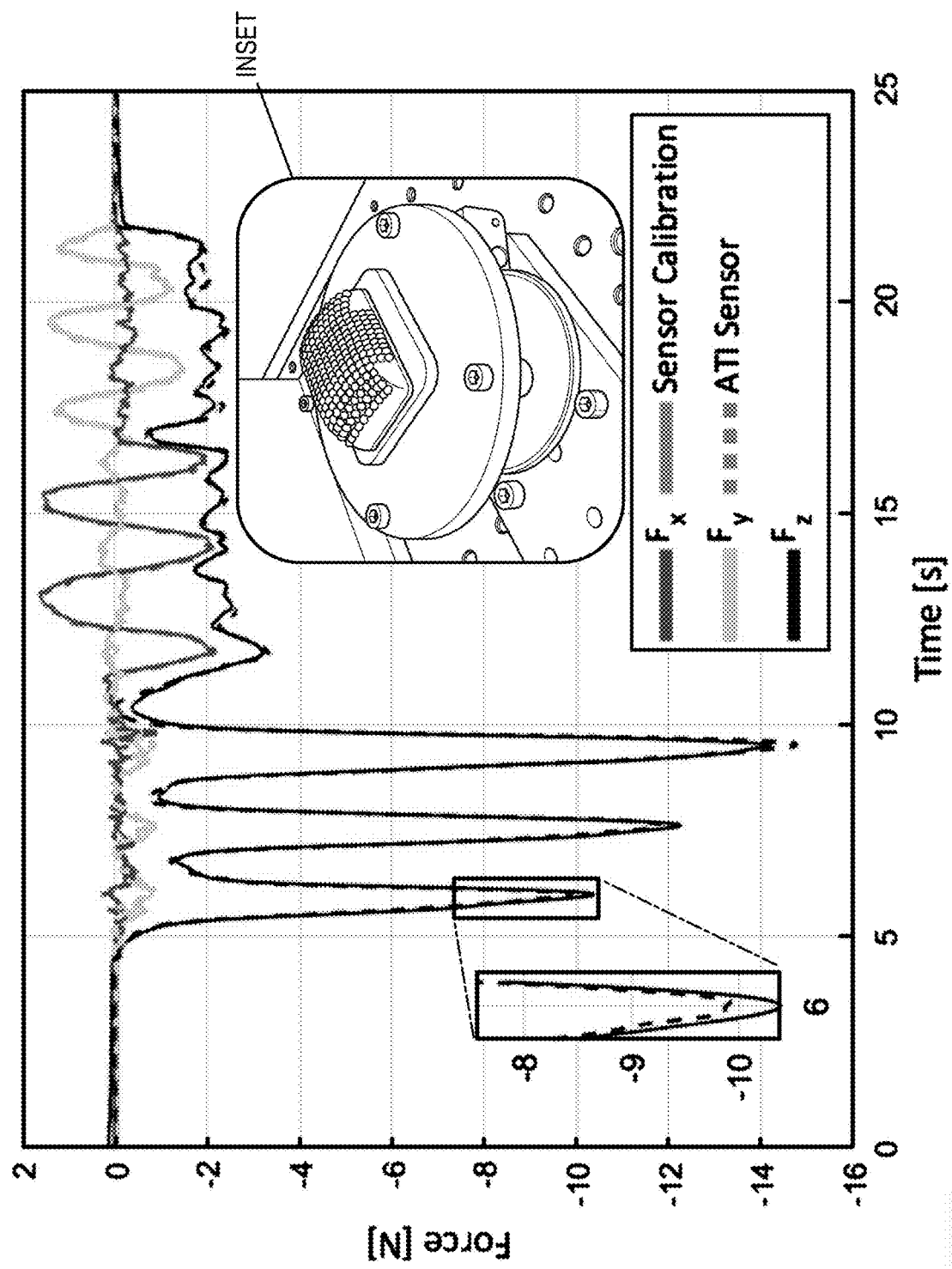
FIG. 9 is a graph showing the sensor calibration of normal and shear force.

The tactile sensor described in FIG. 3 is calibrated by mounting the pad on a commercial ATI Gamma force/torque load cell and manually applying forces with a flat, rigid object. Each sensor taxel is calibrated independently. FIG. 9 is a graph showing the sensor calibration of normal and shear forces compared to the ATT force/torque sensor, with $R^2=0.99$ using the test setup shown in the inset photograph of FIG. 9. Specifically, FIG. 9 shows an enlarged view of the first trough to highlight the small differences in FBG and ATI signals. Forces are applied manually to each taxel and transmitted through the substrate to the ATI sensor beneath, as shown in the inset photograph of FIG. 9.

The acquisition frequency may be up to 6 kHz, and for the purposes of calibration the FBGs and load cell are sampled at 100 Hz and apply low pass filters with a cutoff frequency of 15 Hz. For each taxel, a second-order polynomial is fit to the corresponding (x, y, z) forces from the load cell. For the taxel calibration shown in FIG. 5, an $R^2$ value of 99.6% is achieved on training data, with a cross-validation $R^2$ of 97.3% on unseen data, indicating a close fit to the ATI. For all taxels from both sensors, calibration R2 values above 90%, with an average value of 96.2% across taxels are obtained.

Figure 10D:
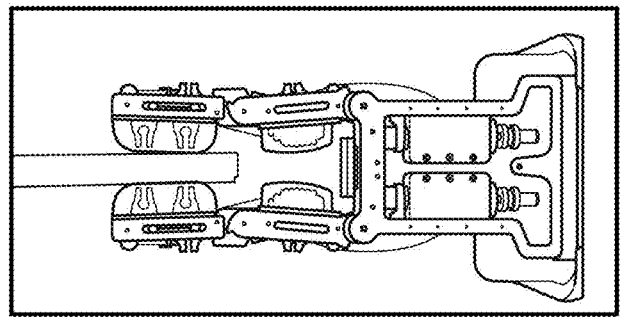
Figure 10C:
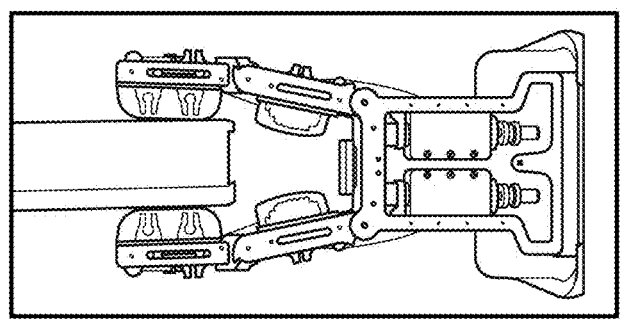
Figure 10B:
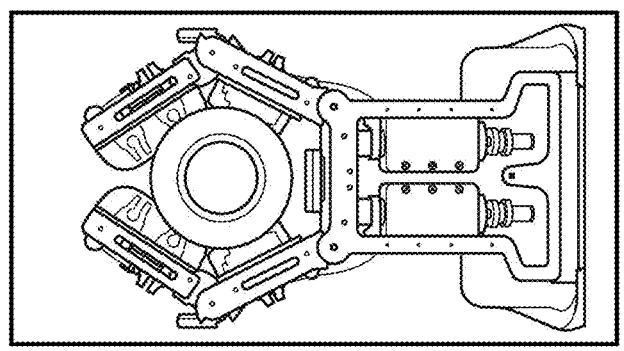
Figure 10A:
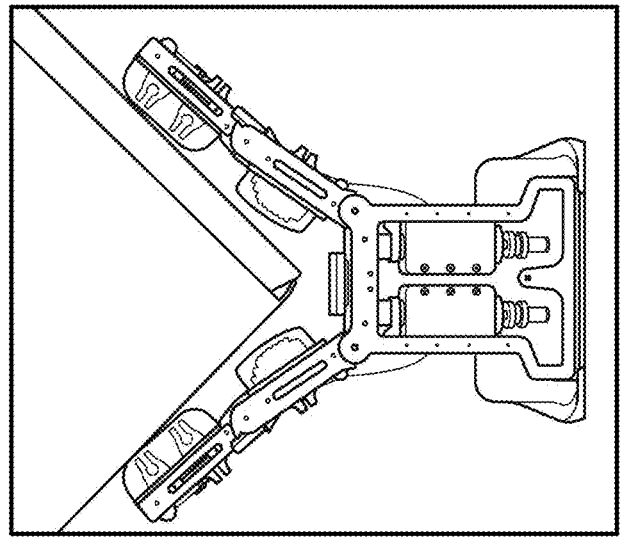

The photographs of FIGS. 10A, 10B, 10C, and 10D show several robotic grasps using the tactile sensor described in FIGS. 3 and 4 and motivated by expected manipulation tasks such as fetching boxes or tools with the Astrobee free-flyer. The photographs of FIGS. 10A, 10B, 10C, and 10D show demonstrations of several grasps using sensor data to monitor grasp conditions. FIG. 10A shows a corner grasp with planar contact, demonstrating distal hyperextension; FIG. 10B shows an enveloping grasp around a polycarbonate tube; FIG. 10C shows a pinch grasp on a rectangular plastic box; FIG. 10D shows a pinch grip on a thin plastic plate.

For superior tactical robotic gripping using the tactile sensor described in FIG. 3, three conditions are explored: (1) detection of misalignment with an object, which is especially a concern for free-flying robots (shown in the graph and inset of FIG. 11A); (2) perception of shear forces during object pullout (shown in the graph and inset of FIG. 11B), and (3) grasp adjustment to achieve planar contact for increased grasp stability (shown in the graph and inset of FIG. 11C).

FIG. 11A reflecting Detection of Misalignment: In this task, the gripper is rotated to ≈20° and closed on a vertical object (see photographic inset of FIG. 11A for geometry). The object makes contact with the distal phalange at an angle. The misalignment can be deduced based on which taxels are loaded and the resulting force vector. The diagram of FIG. 11A shows the results of grasp misalignment: the gripper is first rotated to a misalignment angle and closed on a vertical object. Then an aligned grasp is attempted. The data shown are for the left finger, for which the left rear taxel makes contact.

Detection of Misalignment: the plots of the graph of FIG. 11A illustrates the sensor's ability to detect a misaligned grasp. The object is initially misaligned, resulting in a multi-component force vector. When aligned, the force is primarily normal to the sensor surface in the Fz direction. Contact force orientation can also be deduced from the directional loads sensed on each taxel.

FIG. 11B reflecting Shear Force: the gripper holds an acrylic plate which is tugged several times in the x direction with increasing intensity. Shear and normal forces for the left rear taxel are plotted. Mechanical coupling in the gripper causes the z force to vary along with the x force; the y force is largely unaffected. Shear Force Perception: In the second task, a pinch grasp is performed on a thin acrylic sheet (see photographic inset of FIG. 11B for geometry). The acrylic is pulled away from the gripper with varying force and sensor data are recorded.

Perception of Shear; the graph of FIG. 11B depicts the sensor's ability to perceive shear forces as an object is pulled from its grasp. As the object is pulled, an increase in normal force (Fz) is also observed due to mechanical coupling in the underactuated gripper; the rear taxels rolls into the object as the object is pulled. The plot presents data for a rear taxel, illustrating the expected effect.

FIG. 11C reflecting Grasp Adjustment: Independent control of the proximal and distal phalanges enables grasp adjustment to increase the contact area. Specifically, achieving planar contact at the distal phalanges during pinch or corner grasps of flat objects significantly improves grasp stability. This capability is performed using tactile information. The distal phalange "rolls" onto the surfaces, contacting the front taxels first and then the rear as the phalange hyperextends. Planar contact is determined when the normal forces at the front and rear taxels are approximately equal. Planar Contact: The gripper performs a corner grasp on a box (see photographic inset of FIG. 11C for geometry). Spatial distribution of the sensing towers enables perception of grasp events and planar contact.

Grasp Adjustment: the graph of FIG. 11C presents data from two taxels of a single sensor, one in the front and one in the rear. Contact events are annotated. The front taxel makes initial contact as the finger rotates. The phalange rolls further onto the surface, with loading on the rear taxel visible. The normal force distribution between the taxels is then adjusted until planar contact is reached.

The described sensor and gripper combination provides the ability to perform a wide range of anticipated grasps with the Astrobee free-flyer while simultaneously perceiving contact conditions. The detection of grasp misalignment, shear forces, and grasp readjustment is described and demonstrated. A large focus is aimed on achieving planar contact at the distal phalange to improve grasp stability in corner and pinch grasps. For corner grasps specifically, such an approach reduces the changes of object ejection (slipping out of the grasp as the fingers close)-particularly a concern for free floating robots and objects.

In the robotic gripper described, identical motors are used to control the proximal and distal phalanges for simplicity. The functionality of each motor, however, differs significantly. In addition to experiencing a larger lever, the proximal motor must extend the backboard spring to achieve distal hyperextension. Moreover, the proximal motor must have sufficient torque to overcome the effect of the distal motor when holding a given position. A larger gear ratio may be used for the proximal tendon. Notably back drivability is less critical in the proximal phalange, though some compliance is desirable for safety.

FIG. 11B illustrates the described gripper's ability to detect shear forces. Such functionality provides benefits when manipulating tools and moving objects. Moreover, understanding multi-axis forces is conducive to collaborative tasks between the Astrobee and astronauts or between multiple free-flyers. Astrobee groups can transport and manipulate large objects, monitoring load sharing via the tactile sensors.

In a descriptive embodiment, a multi-axis tactile sensor and an associated gripper for the Astrobee free-flyer is provided. The sensor employs a single optical fiber with seventeen FBGs spaced across multiple sensing towers, enabling a compact design. The sensors have the ability to provide gripper alignment information, detect shear forces, and enable grasp readjustments.

It may be advantageous to mount the gripper on a planar free-floating platform for the ability to perform corner grasps, potentially with initial misalignment, with a focus on controlling the hand and platform to minimize the chance of ejecting objects from the grasp.

Additionally, adding a sensing pad to the proximal phalanges may increase functionality, particularly for enveloping grasps. As a result of increased sensing, slip detection, surface texture identification, and other dynamic phenomena are also of interest, taking advantage of the ability to sample the FBGs at over 1 kHz.

While the sensor and gripper embodiment provided are designed and described with reference to the Astrobee inside the ISS, extravehicular applications (EVA) are readily anticipated.

Tower structures made of ceramic materials, rather than plastic towers, using 3D printed ceramics (e.g., using FormJabs Form2 printer) may be advantageous. A ceramic tower structure provides a much wider operating temperature range and exhibits a coefficient of thermal expansion closer to the glass fiber, reducing challenges with thermal strain and bonding to the pillars.

Gripping pads, described as made of urethane, may also be made of a low-outgassing silicone RTV compound, particularly advantageous for EVA use.

The foregoing description of the exemplary embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A multi-axis fiber Bragg grating sensing system comprising:
   a plurality of spatially distributed and mechanically isolated three dimensional multi-axis sensing towers, each of said three dimensional multi-axis sensing towers having a plurality of connected nonparallel sensing pillars, each of said sensing pillars having a straight portion of a length and straightness to support a fiber Bragg grating, and each of said three dimensional multi-axis sensing towers connected to at least one other of said three dimensional multi-axis sensing towers via a curved portion having a curvature radius equal to the minimum bend radius of an affixed optical fiber;
   an optical fiber affixed to each of said three dimensional multi-axis sensing towers, said affixed optical fiber having a plurality of fiber Bragg gratings wherein a fiber Bragg grating is positioned along a straight portion of a sensing pillar of the tower; and,
   said optical fiber connected to a fiber Bragg grating sensor interrogator for capturing and measuring wavelength data from said plurality of fiber Bragg gratings for measuring multi-axis force information applied to each of said three dimensional multi-axis sensing towers.

2. The multi-axis fiber Bragg grating system of claim 1, wherein said affixed optical fiber to each of said three dimensional multi-axis sensing towers is a single optical fiber.

3. The multi-axis fiber Bragg grating system of claim 2, wherein both ends of said affixed optical fiber are connected to a fiber Bragg grating sensor interrogator for capturing and measuring wavelength data from said plurality of fiber Bragg gratings from both directions of said optical fiber.

4. The multi-axis fiber Bragg grating system of claim 1, wherein said data from said plurality of fiber Bragg gratings is a change in light wavelength in response to a force applied to said three dimensional tower.

5. The multi-axis fiber Bragg grating system of claim 1, wherein said three dimensional multi-axis sensing towers are plastic.

6. The multi-axis fiber Bragg grating system of claim 1, wherein said three dimensional multi-axis sensing towers are ceramic.

7. The multi-axis fiber Bragg grating system of claim 1, wherein said optical fiber is routed in grooves in said three dimensional multi-axis sensing towers and affixed to said three dimensional multi-axis sensing towers using adhesive.

8. The multi-axis fiber Bragg grating system of claim 1, wherein said optical fiber has a minimum bend radius of 6 mm and each of said three dimensional multi-axis sensing towers a footprint of less than 12 mm by 12 mm.

9. The multi-axis fiber Bragg grating system of claim 1, wherein said optical fiber has a minimum bend radius of 4 mm and each of said three dimensional multi-axis sensing towers a footprint of less than 8 mm by 8 mm.

10. The multi-axis fiber Bragg grating system of claim 1, further comprising a mechanically isolated fiber Bragg grating for temperature sensing and calibration.

11. The multi-axis fiber Bragg grating system of claim 1, wherein said straight portion of said sensing pillars of said three dimensional multi-axis sensing towers further comprise a cutout.

12. The multi-axis fiber Bragg grating system of claim 1, wherein said three dimensional multi-axis sensing towers are encapsulated in an elastomer.

13. The multi-axis fiber Bragg grating system of claim 12, wherein said elastomer mechanically isolates said three dimensional multi-axis sensing towers.

14. The multi-axis fiber Bragg grating system of claim 1, wherein said optical fiber connected to a fiber Bragg grating sensor interrogator has an operating wavelength in the range of 650 to 850 nm.

15. The multi-axis fiber Bragg grating system of claim 1, wherein each of said three dimensional multi-axis sensing towers have at least three connected nonparallel sensing pillars for force sensing in three spatial directions (x, y, z).

16. A multi-axis fiber Bragg grating tactile sensing system comprising:
    a plurality of spatially distributed and mechanically isolated three dimensional multi-axis sensing towers, each of said three dimensional multi-axis sensing towers having at least four connected nonparallel sensing pillars, each of said sensing pillars having a straight portion of a length and straightness to support a fiber Bragg grating and each of said three dimensional multi-axis sensing towers connected to at least one other of said three dimensional multi-axis sensing towers via a curved portion having a curvature radius equal to the minimum bend radius of an affixed optical fiber;
    a single optical fiber routed in grooves in said three dimensional multi-axis sensing towers and affixed to said three dimensional multi-axis sensing towers using adhesive, said affixed optical fiber having at least four fiber Bragg gratings for each of said three dimensional multi-axis sensing towers, wherein a fiber Bragg grating is positioned along a straight portion of a sensing pillar of the tower; and,
    both ends of said affixed optical fiber connected to a fiber Bragg grating sensor interrogator for capturing and measuring wavelength data from said at least four fiber Bragg gratings from both directions of said optical fiber.

17. The multi-axis fiber Bragg grating system of claim 16, further comprising a mechanically isolated fiber Bragg grating for temperature sensing and calibration.

18. The multi-axis fiber Bragg grating system of claim 16, wherein said straight portion of said sensing pillars of said three dimensional multi-axis sensing towers further comprise a cutout.

19. The multi-axis fiber Bragg grating system of claim 16, wherein said three dimensional multi-axis sensing towers are covered in an elastomer.

20. The multi-axis fiber Bragg grating system of claim 19, wherein said elastomer mechanically isolates said three dimensional multi-axis sensing towers.

21. The multi-axis fiber Bragg grating system of claim 16, wherein said optical fiber connected to a fiber Bragg grating sensor interrogator has an operating wavelength in the range of 650 to 850 nm.

22. A multi-axis fiber Bragg grating tactile sensing tower comprising:

- a plurality of three dimensional multi-axis sensing towers having at least four connected nonparallel sensing pillars, each of said sensing pillars having a straight portion of a length and straightness to support a fiber Bragg grating and each of said three dimensional multi-axis sensing towers connected to at least one other of said three dimensional multi-axis sensing towers via a curved portion having a curvature radius equal to the minimum bend radius of an affixed optical fiber;
- a single optical fiber routed in grooves in said three dimensional multi-axis sensing towers and affixed to said three dimensional multi-axis sensing towers using adhesive, said affixed optical fiber having at least four fiber Bragg gratings for each of said three dimensional multi-axis sensing towers, wherein a fiber Bragg grating is positioned along a straight portion of a sensing pillar of the tower;

wherein said optical fiber has a minimum bend radius of 4 mm and each of said three dimensional multi-axis sensing towers a footprint of less than 8 mm by 8 mm; and, both ends of said affixed optical fiber connected to a fiber Bragg grating sensor interrogator for capturing and measuring wavelength data from said at least four fiber Bragg gratings from both directions of said optical fiber.

\* \* \* \* \*